US009619423B1

(12) United States Patent
Perry

(10) Patent No.: US 9,619,423 B1
(45) Date of Patent: Apr. 11, 2017

(54) MEMORY-MAPPED STATE BUS FOR INTEGRATED CIRCUIT

(71) Applicant: ALTERA CORPORATION, San Jose, CA (US)

(72) Inventor: Steven Perry, High Wycombe (GB)

(73) Assignee: Altera Corporation, San Jose, CA (US)

( * ) Notice: Subject to any disclaimer, the term of this patent is extended or adjusted under 35 U.S.C. 154(b) by 314 days.

(21) Appl. No.: 14/066,447

(22) Filed: Oct. 29, 2013

(51) Int. Cl.
*G06F 12/00* (2006.01)
*G06F 13/40* (2006.01)
*G06F 12/06* (2006.01)
*G06F 12/0831* (2016.01)

(52) U.S. Cl.
CPC ............ *G06F 13/404* (2013.01); *G06F 12/06* (2013.01); *G06F 12/0833* (2013.01)

(58) Field of Classification Search
CPC .. G06F 13/42; G06F 12/0815–12/0822; G06F 12/0824–12/833
USPC ........................................................ 711/209
See application file for complete search history.

(56) References Cited

U.S. PATENT DOCUMENTS

| 5,872,986 | A | * | 2/1999 | Heeb ................................. 712/1 |
| 6,046,603 | A | * | 4/2000 | New ................ H03K 19/17752 326/38 |
| 6,526,557 | B1 | * | 2/2003 | Young .............. H03K 19/17756 326/38 |
| 2007/0097917 | A1 | * | 5/2007 | Kang ...................... H04L 45/48 370/331 |
| 2009/0276102 | A1 | * | 11/2009 | Smith et al. ................... 700/284 |
| 2010/0306431 | A1 | * | 12/2010 | Adkins ............... G06F 13/4291 710/110 |
| 2012/0066423 | A1 | | 3/2012 | Choo et al. |
| 2012/0126850 | A1 | * | 5/2012 | Wasson ............... G06F 15/7867 326/38 |
| 2013/0346756 | A1 | * | 12/2013 | Cook et al. .................... 713/189 |

* cited by examiner

*Primary Examiner* — Prasith Thammavong
(74) *Attorney, Agent, or Firm* — Fletcher Yoder, P.C.

(57) ABSTRACT

Systems and devices are provided for broadcasting a message to addressed logic blocks in lieu of, or in addition to, programming individual status registers of an integrated circuit. One such device may be an integrated circuit that includes a broadcast bus and addressed logic blocks. The broadcast bus may broadcast an addressed message that includes content and a target address. Each of the addressed logic blocks may receive the addressed message from the broadcast bus and use the content of the addressed message only when the target address matches an address assigned to that logic block.

19 Claims, 5 Drawing Sheets

MEMORY-MAPPED STATE BUS FOR INTEGRATED CIRCUIT

BACKGROUND

This disclosure relates to a broadcast bus of an integrated circuit that can broadcast an addressed message to addressed logic blocks of the integrated circuit.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Modern electronic devices, such as computers, mobile phones, digital cameras, and media players, use integrated circuits to operate on data. Many integrated circuits, including many field programmable gate array (FPGA) integrated circuits, use control and status registers to store operating modes, filtering coefficients, control settings, and so forth. There may be thousands of control and status registers in some integrated circuits. Moreover, these registers may hold data between 18-32 bits wide in some cases. In a programmable device such as an FPGA, soft logic programmed into the fabric of the FPGA may enable a host integrated circuit to update and/or request statuses from the control and status registers of the FPGA. Indeed, the soft logic programmed into the FPGA may consume a significant portion (e.g., 20% or more) of the FPGA fabric, using networks of address decoders and multiplexers to convey signals to and from the control and status registers of the FPGA. These soft logic address decoders and multiplexers may also offer relatively slow and/or inefficient performance.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure relate to systems and devices for broadcasting a message to addressed logic blocks in lieu of, or in addition to, programming individual status registers of an integrated circuit. One such device may be an integrated circuit that includes a broadcast bus and addressed logic blocks. The broadcast bus may broadcast an addressed message that includes content and a target address. Each of the addressed logic blocks may receive the addressed message from the broadcast bus and use the content of the addressed message only when the target address matches an address assigned to that logic block.

Various refinements of the features noted above and below may be used in relation to various aspects of the present disclosure. Further features may also be incorporated in these various aspects as well. These refinements and additional features may be used individually or in any combination. For instance, various features discussed below in relation to one or more of the illustrated embodiments may be incorporated into any of the above-described aspects of the present disclosure alone or in any combination.

The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
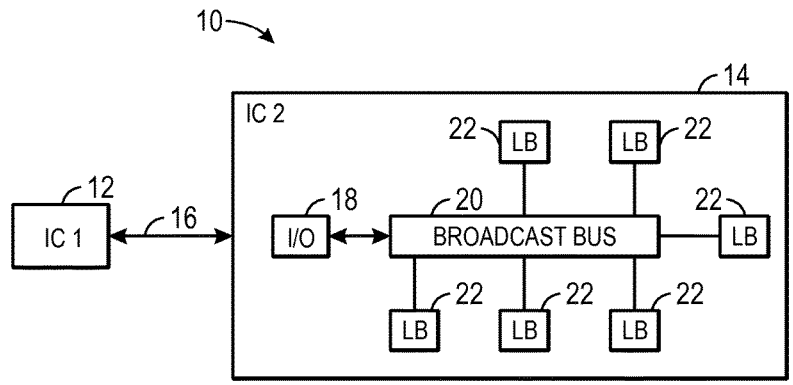
FIG. 1 is a block diagram of an integrated circuit system having a broadcast bus to communicate signals to and from logic blocks of an integrated circuit, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of this disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of this disclosure are not intended to be interpreted as excluding additional embodiments that also incorporate the recited features.

Many integrated circuits may use data utilization circuitry with logic blocks that can be controlled or that can provide status indications via memory registers associated with the logic blocks. One such integrated circuit is a programmable logic device, such as a field programmable gate array (FPGA), which includes data utilization circuitry formed using a programmable fabric. Other integrated circuits may also have data utilization circuitry that uses logic blocks with registers for control and/or status. In this disclosure, a register associated with a logic block that can enable a host device to control and/or ascertain a status of the logic block is referred to as a "control and status register" or "CSR." In other words, in this disclosure, the terms "control and status register" or "CSR" refer to a memory register associated with a logic block of data utilization circuitry that can provide control, status, or both control and status for a logic block. The systems, methods, and devices of this disclosure provide a way to access the CSRs of an integrated circuit by way of a broadcast bus formed at least partly using hard logic—that is, logic that is permanently encoded in the architecture of the integrated circuit rather than soft logic that has been programmed into a programmable fabric of the integrated circuit—to broadcast signals to and/or from some or all of the CSRs. By accessing the CSRs of the logic blocks through the hard logic of the broadcast bus rather than soft logic programmed into a programmable fabric of the integrated circuit, the CSRs may be more efficiently managed.

As mentioned above, the broadcast bus of this disclosure may be formed in any integrated circuit having data utilization circuitry composed at least partly of logic blocks. The logic blocks may include, for example, logical arithmetic blocks (LABs), digital signal processing (DSP) blocks, and/or memory blocks. In at least one example, the data utilization circuitry may include a field programmable gate array (FPGA) fabric. In other examples, however, the data utilization circuitry may represent application-specific circuitry of an application-specific integrated circuit (ASIC) or other hard logic. In some embodiments, each logic block may directly couple to the broadcast bus. As used herein, "directly couple" or "couple directly" means to connect to the broadcast bus without intervening logic, such that every logic block that is directly coupled to the broadcast bus receives an address message propagated over the broadcast bus, even though the logic blocks may not operate using certain information (e.g., the content) contained in the addressed message unless the address of the addressed message matches the address of the logic block. In some embodiments, the broadcast bus may be composed at least partly of hardware also used to initially program the logic blocks.

Moreover, an addressed message may be understood to include, among other things, a target address and message content. In this disclosure, the "target address" may indicate the particular logic block(s) that the addressed message is addressed to. The "content" of the message represents information that the targeted logic block(s) may use, and may include, among other things, a control signal (e.g., a status request or data input request) and/or a data signal.

A system 10 of FIG. 1 represents a system that can employ such addressed messages. The system 10 includes a first integrated circuit (IC 1) 12 and a second integrated circuit (IC 2) 14. In the example of FIG. 1, the first integrated circuit 12 acts as a host device that may send a communication signal 16 (e.g., which may include one or more addressed messages) to the second integrated circuit 14. Input/output (I/O) logic 18 may pass the signal to a broadcast bus 20 formed primarily of hard logic in the second integrated circuit 14. The broadcast bus 20 may couple directly to various logic blocks (LBs) 22. The broadcast bus 20 may broadcast the content of the communication signal 16 as an addressed message to only specific logic blocks 22 of the second integrated circuit 14. Thus, in this way, the first integrated circuit 12 may issue control and/or status request messages to the specific logic blocks 22 of the second integrated circuit 14 using the broadcast bus 20.

The first integrated circuit 12 and the second integrated circuit 14 may be any suitable integrated circuits. In one example, the first integrated circuit 12 may be a computer processor running software to communicate with the second integrated circuit 14 and the second integrated circuit 14 may be a programmable logic device such as a field programmable gate array (FPGA) device by Altera Corporation of San Jose, Calif. Additionally or alternatively, the second integrated circuit 14 may represent an application-specific integrated circuit (ASIC), a graphics processing unit (GPU), and/or a central processing unit (CPU), to name a few examples. Moreover, the first integrated circuit 12 may be local or remote to the second integrated circuit 14. The first integrated circuit 12 may be any suitable integrated circuit that can communicate with the second integrated circuit 14, and in various examples the first integrated circuit 12 may be a programmable logic device such as an FPGA, an ASIC, a GPU, and/or a CPU.

Figure 2:
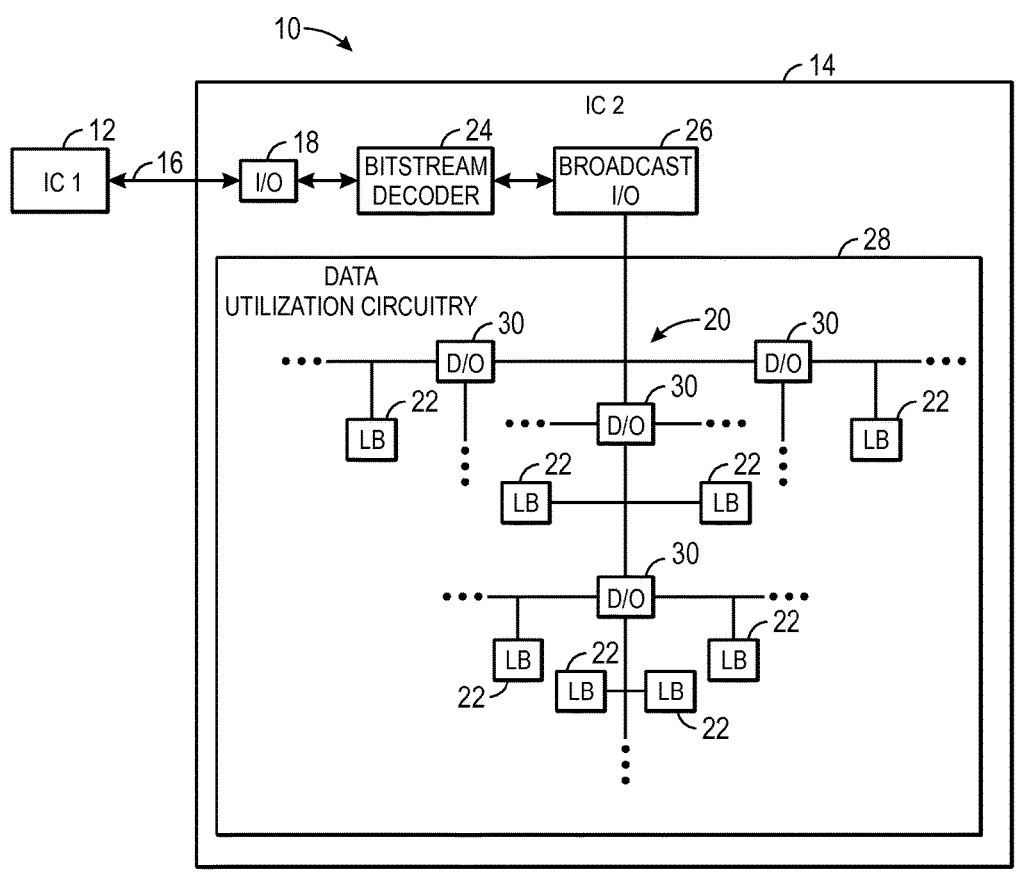
FIG. 2 is a block diagram of the system of FIG. 1 in greater detail, in accordance with an embodiment.

Another, more detailed, example of the system 10 appears in FIG. 2. In the example of FIG. 2, the first integrated circuit 12 is shown to provide the communication signal 16 to the I/O port 18. A bit stream decoder 24 parses the communication signal 16 before sending it to a broadcast input/output (I/O) port 26. From this point, an addressed message may be sent over the broadcast bus 20 into data utilization circuitry 28. The data utilization circuitry 28 may represent any suitable circuitry that can operate on data, and may include, for example, a programmable fabric (e.g., a field programmable gate array (FPGA) fabric). The utilization circuitry 28 may, additionally or alternatively, represent application-specific circuitry of an application-specific integrated circuit (ASIC) or processing circuitry of a graphics processing unit (GPU) or a central processing unit (CPU). The logic blocks 22 make up part of the data utilization circuitry 28. The logic blocks 22 enable the data utilization circuitry 28 to perform logical operations on data. As such, the logic blocks 22 may include logical arithmetic blocks (LABs), digital signal processing (DSP) blocks, and/or memory blocks, to provide a few examples.

Figure 3:
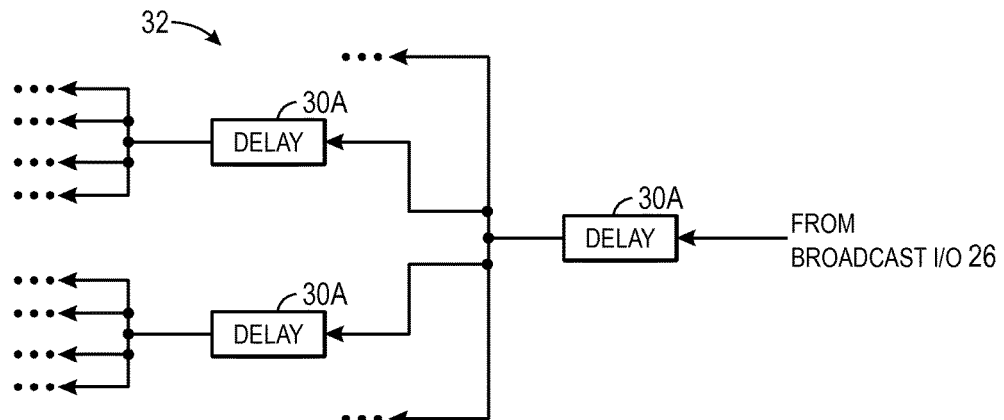
FIGS. 3 and 4 are block diagrams of inflow and outflow channels of the broadcast bus that respectively convey signals to and from the logic blocks, in accordance with embodiments.

The logic blocks 22 may directly couple to the broadcast bus 20. Various delay and OR stages (D/O) 30 of the broadcast bus 20 may respectively propagate signals to and from the logic blocks 22. For instance, as shown in FIG. 3, delay (D) stages 30A of the delay and OR stages (D/O) 30 of the broadcast bus 20 may propagate addressed message signals to the logic blocks (LBs) 30 via an inflow bus 32 portion of the broadcast bus 20. The configuration of the inflow bus 32 portion of the broadcast bus 20 shown in FIG. 3 may be referred to as a Spanning tree. In the example of FIG. 3, each delay (D) stage 30A outputs to four signal lines by way of example, but any other suitable number of signal lines may be employed. Moreover, in other examples, the inflow bus 32 portion of the broadcast bus 20 may use other logic to propagate the signal (e.g., amplifiers) and/or may not include multiple stages. In some embodiments, the broadcast bus 20 may include hardware components also used to initially program the logic blocks 22 (e.g., if the logic blocks 22 are part of an FPGA fabric).

Figure 4:
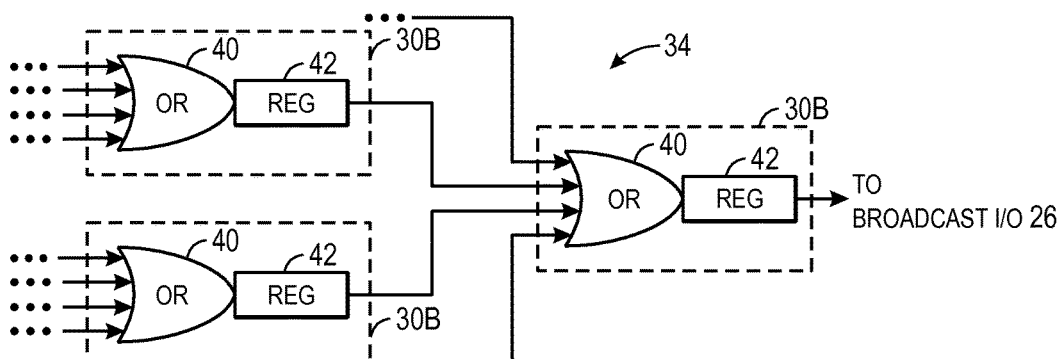

The logic blocks 22 may reply by propagating a message back to the broadcast I/O port 26 through an outflow bus 34 portion of the broadcast bus 20, as shown in FIG. 4. In the configuration of the outflow bus 34 portion of the broadcast bus 20, each OR stage 30B of the outflow bus 34 portion of the broadcast bus 20 may include an OR gate 40 coupled to a propagation register 42. The OR gate 40 may receive any suitable number of signal lines of the outflow bus 34 portion of the broadcast bus 20; four signal lines are shown in FIG. 4 by way of example. As will be discussed below, substantially only one of the logic blocks 22 may issue a reply message signal at any one time. As such, the OR gate 40 may receive a reply message signal and amplify and/or propagate the reply message signal using the propagation register 42, which may act as a buffer and/or an amplifier. Thus, a signal from one of the logic blocks 22 at any point along the broadcast bus 20 may be propagated back to the broadcast I/O port 26.

Figure 5:
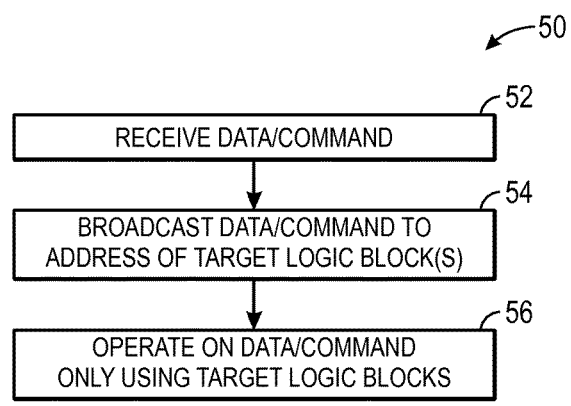
FIG. 5 is a flowchart of a method for broadcasting signals to the logic blocks using the broadcast bus, in accordance with an embodiment.

As shown by a flowchart 50 of FIG. 5, a specific logic block 22 may receive a control signal and/or a command via an addressed message over the broadcast bus 20, thereby avoiding soft-coded network address decoders and multiplexers. For example, the second integrated circuit 14 may receive a control signal and/or a command from the first integrated circuit 12 (block 52). The control signal and/or command may be any suitable addressed message to control one or more of the logic blocks 22 of the second integrated circuit 14. As will be discussed below, the control signal and/or command may be addressed to a particular one or more logic blocks 22. The second integrated circuit 14 may receive the addressed message and broadcast the addressed message from the broadcast I/O port 26 over the broadcast bus 20 to some or all of the logic blocks 22 (block 54). Only the particular logic blocks 22 to which the message is addressed may operate using the content of the addressed message (block 56). For example, the addressed message may be a command for a particular logic block 22 to change a filter coefficient stored in memory. That logic block 22 may receive the command via the broadcast bus 20 and change the filter coefficient accordingly, while other logic blocks 22 may not be affected by the command.

The broadcast bus 20 may convey addressed messages of any suitable format. In various examples discussed below, the broadcast bus 20 may be a serial bus that conveys serial addressed messages to and from the logic blocks 22. In some examples, the broadcast bus 20 may be a parallel bus that conveys addressed messages in a parallel format. Additionally or alternatively, the broadcast bus 20 may be a hybrid bus that conveys messages in a hybrid serial and parallel format.

Figure 6:
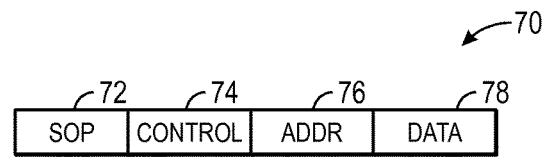
FIG. 6 is a block diagram of a serial address message that may be conveyed by the broadcast bus, in accordance with an embodiment.
Figure 7:
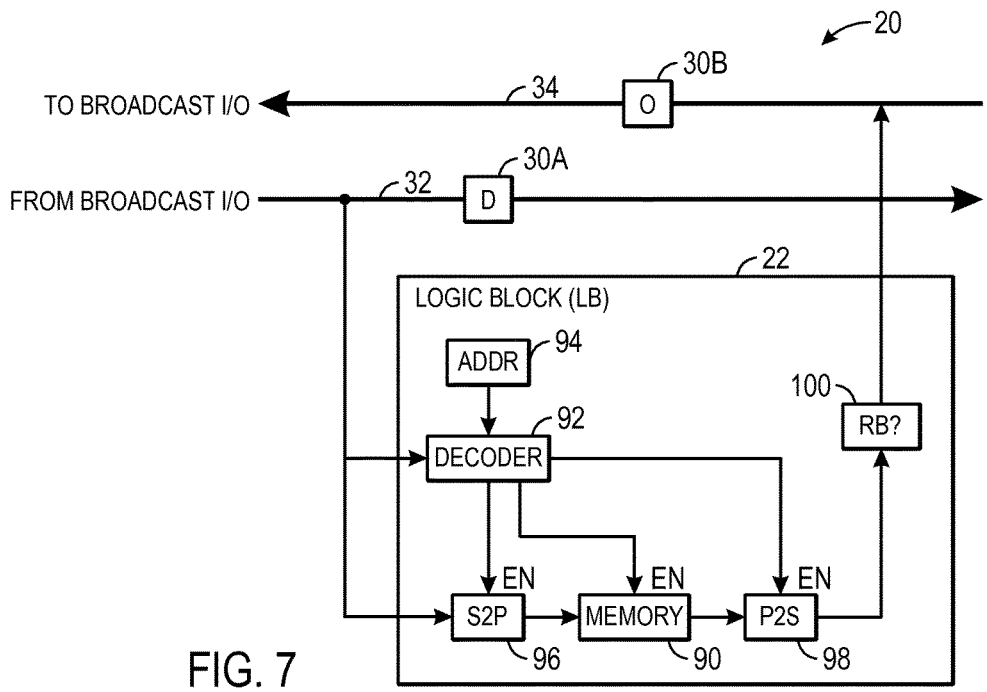
FIG. 7 is a block diagram of a logic block coupled to a serial configuration of the broadcast bus, in accordance with an embodiment.

In an example of FIGS. 6 and 7, the broadcast bus 20 may be a serial bus that conveys messages in serial format to and from the logic blocks 22. The addressed messages may take any suitable form, including that of a message format 70 shown in FIG. 6. The message format 70 includes a start of packet (SOP) field 72, a control signal field 74, a target address field 76, and a data field 78. Other message formats may have more or fewer fields. For example, an addressed message in which the control signal field 74 includes a status request may not include the data field 78. The start of packet (SOP) field 72 may indicate the start of a message that has the message format 70. The control signal field 74 may convey a command. The command may include, for example, a request for the contents of a status register and/or a command to store data located in the data field 78. The target address field 76 may identify the logic block(s) (LBs) 22 the message is being sent to.

For example, as shown in FIG. 7, a serial message (e.g., of the message format 70) may propagate from the broadcast I/O port 26 to some or all of the logic blocks 22 via the outflow bus 32 of the broadcast bus 20. In FIG. 7, only one logic block 22 is shown being connected to the broadcast bus 20 for ease of explanation, but in an actual implementation, a vast number of logic blocks 22 may be connected to the broadcast bus 20. The logic block 22 is shown in FIG. 7 as receiving the addressed message from the outflow bus 32 of the broadcast bus 20. The logic block 22 may include a memory register 90 that may contain some data related to the operation of the logic block 22. The memory register 90 may be understood to represent a control and status register (CSR). For instance, the memory register 90 may store a filter coefficient (e.g., for a finite impulse response (FIR) filter used in digital signal processing). In one example, the addressed message received by the logic block 22 may include a command (e.g., in the control signal field 74) and data (e.g., in the data field 78) to cause the logic block 22 to replace the data currently in the memory register 90 (e.g., update the filter coefficient with new data). In another example, the addressed message received by the logic block 22 over the broadcast bus 20 may include a command (e.g., in the control signal field 74) to cause the logic block 22 to output the data currently in the memory register 90 as a status update (e.g., to read back the filter coefficient currently stored in the memory register 90).

The logic block 22 may process the addressed message from the broadcast bus 20 by receiving the message into a serial decoder 92 that may be formed using any suitable hard logic or soft logic to carry out the functionality described below. Specifically, the serial decoder 92 may cause the logic block 22 to use the addressed message only when the target address field 76 of the message matches an address of the logic block 22, which may be stored in an address register 94. In one example, the addressed message may be addressed to the logic block 22 shown in FIG. 7. The control signal field 74 of the addressed message may include a command to store data from the data field 78 in the memory register 90 of the logic block 22. The bits of the addressed message may be in a particular order to facilitate decoding in the decoder 92. The decoder 92 may undertake a word-level decode in some cases (e.g., to determine whether to cause contents of the memory register 90 of the logic block 22 to be read back).

Considering the first example mentioned above, the logic block 22 may store a filter coefficient used in digital signal processing in the data register 90. The addressed message may cause the logic block 22 to update the filter coefficient by replacing the contents of the memory register 90 with the contents of the data field 78 of the addressed message. Continuing with this example, the decoder 92 may determine that the target address field 76 of the addressed message matches the address stored in the address register 94. In response, the decoder 92 may send an enable signal EN to a parallel-to-serial (P2S) block 96. The enable signal EN may be provided to the P2S block 96 immediately after the target address field 76 is received by the decoder 92, resulting in the data of the data field 78 of the addressed message being parallelized by the P2S block 96 and stored in the memory register 90. In this way, only logic block(s) (LBs) 22 with the same address as indicated in the target address field 76 of the addressed message may use the contents of the addressed message.

In another example, also mentioned briefly above, the addressed message received by the logic block 22 may, when the address matches of the message matches the address of the logic block 22, convey a command to read out the contents of the memory register 90 of the logic block 22. For example, the decoder 92 may receive the addressed message from the outflow bus 32 of the broadcast bus 20. When the target address field 76 of the addressed message matches the address stored in the address register 94, the decoder 92 may use the contents of the control signal field 74 of the addressed message. In the example discussed in this paragraph, the contents of the control signal field 74 may include a command to read out the contents of the memory register 90. Receiving such a command, the decoder 92 may transmit enable signals EN to the memory register 90 and a parallel-to-serial (P2S) block 98. The data from the memory register 90 thus may be read out onto the return component 34 of the broadcast bus 20.

Figure 8:
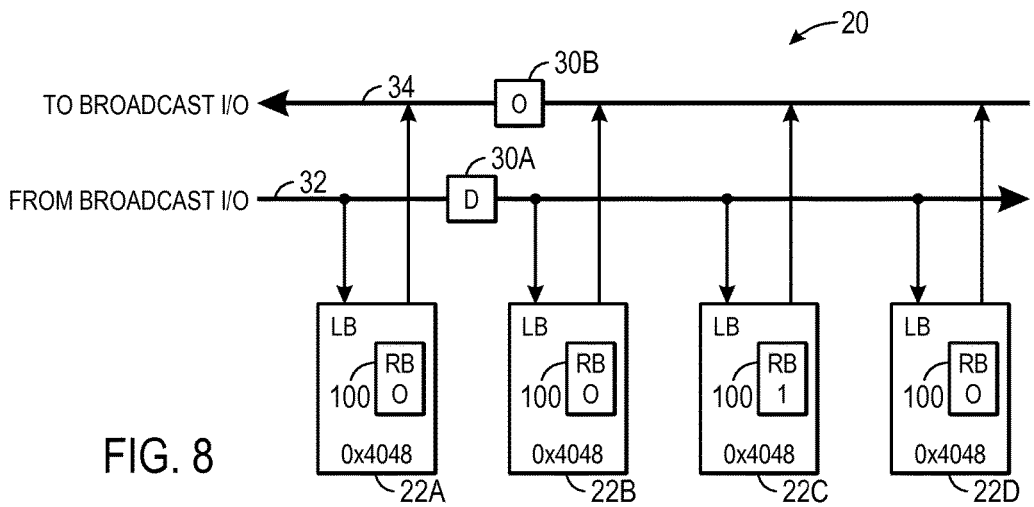
FIG. 8 is a block diagram illustrating the use of a "read-back" register to prevent multiple logic blocks that share a common address from overloading the broadcast bus, in accordance with an embodiment.

In some examples, such as the example shown in FIG. 7, a read-back (RB) block 100 may specify whether the logic block 22 reads back the data from the memory register 90 onto the broadcast bus 20 when the logic block 22 is so directed by an addressed message. The read-back (RB) block 100 may be particularly useful when more than one logic block 22 shares a particular address. For instance, as shown in FIG. 8, several logic blocks 22A, 22B, 22C, and 22D all may be assigned the same address (e.g., 0×4048) in a circuit design programmed in the data utilization circuitry 28 of the second integrated circuit 14. In the example of FIG. 8, the four logic blocks 22A, 22B, 22C, and 22D all connect to the broadcast bus 20. The logic blocks 22A, 22B, 22C, and 22D may or may not connect to the broadcast bus 20 along the same delay and OR stage 30. The logic block 22A, for example, is shown to connect to the broadcast bus 20 on one side of a delay stage 30A and an OR stage 30B, while the logic blocks 22B, 22C, and 22D connect to the broadcast bus 20 on the other side of the delay stage 30A and the OR stage 30B.

Because the logic blocks 22A, 22B, 22C, and 22D all share the same address, a command requesting the contents of the memory register 90 of the logic blocks 22A, 22B, 22C, and 22D could cause interference on the outflow bus 34 of the broadcast bus 20 if all of the logic blocks 22A, 22B, 22C, and 22D issued a responding message. As such, when multiple logic blocks 22 all share a common address, as in the example of FIG. 8, only one may have a read-back flag set in the read-back (RB) block 100, thereby allowing that particular logic block 22 to read back its stored data. As used herein, a "flag" being "set" refers to a condition in which the read-back (RB) block 100 indicates that the logic block 22 should output the contents of the memory register 90. The flag of the read-back (RB) block 100 may include one or more bits that may convey information by being set to a logical 1 or 0 as may be determined by a particular circuit design implementation.

In the example of FIG. 8, only in the logic block 22C is the flag of the read-back (RB) block 100 set. Thus, when an addressed message instructing logic blocks 22 having, for example, an address of 0×4048 is sent over the broadcast bus 20, only the logic block 22C may provide a signal in response. That is, only one logic block 22 (e.g., only the logic block 22C) may provide a response when so instructed by a message addressed to multiple logic blocks 22 (e.g., the logic blocks 22A, 22B, 22C, and 22D). Since these logic blocks 22 have the same address, the content of their respective memory registers 90 may be the same, so outputting the contents of one logic block 22 having that address may suffice to provide the contents of all of the commonly addressed logic blocks 22. In this way, the read-back (RB) block 100 facilitates a response from only one of several logic blocks 22 that share a common address.

Figure 9:
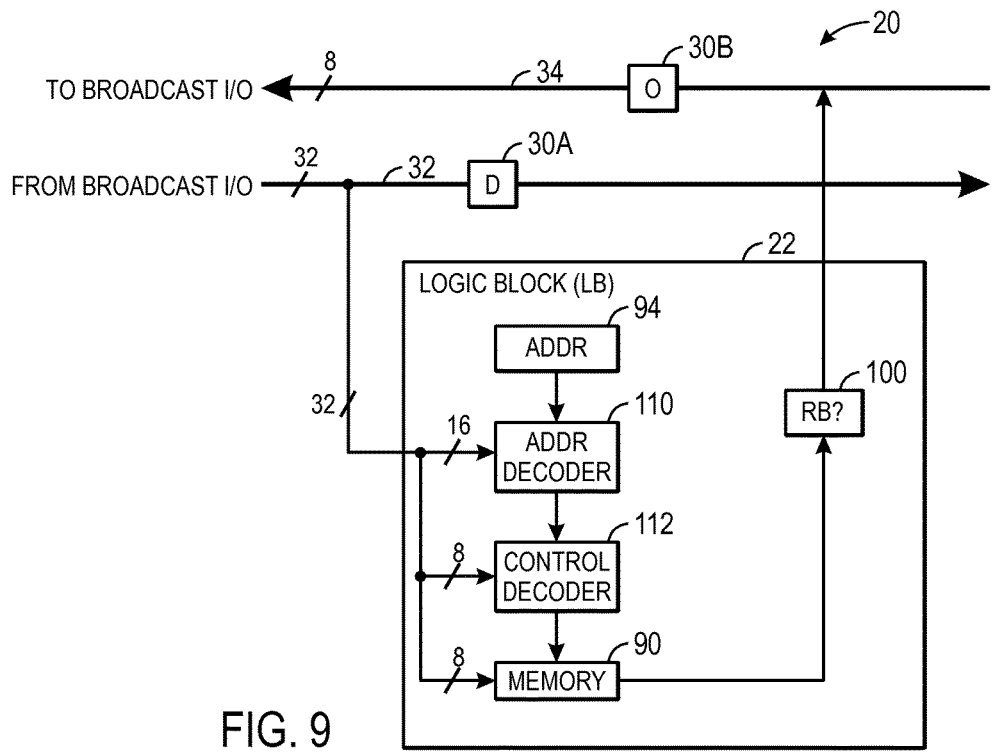
FIG. 9 is a block diagram of a logic block coupled to a parallel configuration of the broadcast bus, in accordance with an embodiment.

When the broadcast bus 20 transmits the addressed message in serial format, as described with reference to FIGS. 6-8, the broadcast bus 20 may take up proportionally less of the die space of the second integrated circuit 14 than an embodiment of the broadcast bus 20 that transmit parallel data. Even so, a parallel embodiment of the broadcast bus 20 may transmit addressed messages to the logic blocks 22 at a higher bandwidth. FIG. 9 illustrates one example of a logic block 22 coupled to a parallel embodiment of the broadcast bus 20. In the example of FIG. 9, the inflow bus 32 of the broadcast bus 20 includes thirty-two signal-carrying channels. Any other suitable numbers of parallel signal-carrying channels may be employed. As mentioned above, an addressed message sent over the broadcast bus 20 may be retrieved by some or all of the logic blocks 22.

To facilitate the parallel embodiment of the broadcast bus 20 shown in FIG. 9, various decoders encoded in hard and/or soft logic may interpret addressed messages received over the broadcast bus 20. The addressed messages, though in a parallel rather than serial format, still may include a target address field, a control signal field, and a data field comparable to those used by serial addressed messages. An address decoder 110 of each logic block 22 may compare an address portion of the addressed message over a first number of channels. By way of example, 16 signal-carrying channels, providing 16 bits of information, may contain the address of the logic block(s) (LBs) 22 to which the message is addressed. The address decoder 110 may compare the address transmitted in the addressed message to the address stored in the address register 94 of the logic block 22. If these match, the address decoder 110 may provide an enable signal to a control decoder 112.

The control decoder 112, when enabled, may read and decode control signal field of the parallel addressed message. By way of example, the control signal field may include eight channels of the inflow bus 32 of the broadcast bus 20 to provide an 8-bit control signal. The memory register 90 may be activated to, for example, input new data from a data field of the addressed message sent over some other portion of the channels of the broadcast bus 20. In one example, the data field of the addressed message may include eight channels of the inflow bus 32 of the broadcast bus 20 to provide an 8-bit data signal. The control signal field may also cause the control decoder 112 to cause the memory register 90 to output its contents onto the outflow bus 34 of the broadcast bus 20. As discussed above, whether the logic block 22 sends the contents of the memory register 90 to the broadcast bus 20 may depend on whether a read-back (RB) block 100 has been set to enable the memory register 90 to be output in the manner discussed above with reference to FIG. 8.

Figure 10:
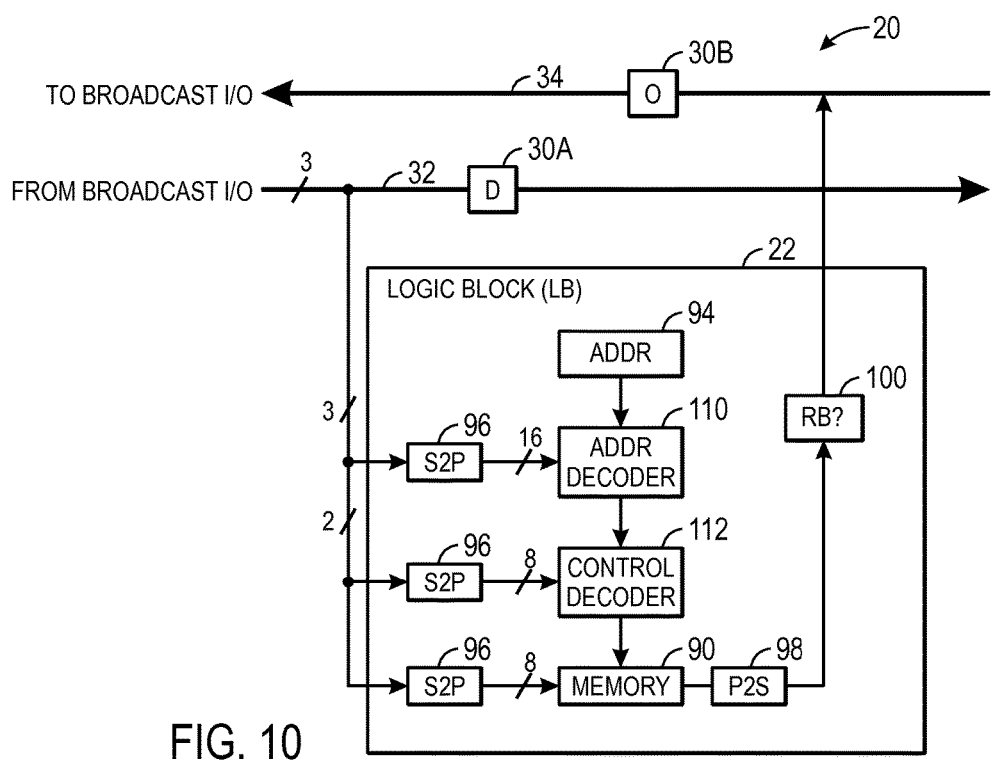
FIG. 10 is a block diagram of a logic block coupled to a hybrid serial—parallel configuration of the broadcast bus, in accordance with an embodiment.

Additionally or alternatively, the broadcast bus 20 may include a hybrid bus that sends serial data over more than one signal-carrying channel, as shown in FIG. 10. For example, the outflow bus 32 of the broadcast bus 20 may include three signal-carrying channels: one to carry a serial address signal, one to carry a serial control signal, and one to carry a serial memory signal. Thus, as shown in FIG. 10, the logic blocks 22 may receive the addressed message transmitted across these three channels, where they may be decoded into a parallel signal by a serial-to-parallel (S2P)

block 96, and the resulting parallel data may be provided to an address decoder 110, a control decoder 112, and memory register 90, respectively. In other examples, the address decoder 110 and/or the control decoder 112 may be one or more serial decoders that receive the serial data from their respective channels directly, without first parallelizing the data, as generally discussed above with reference to FIG. 7. Still considering the example of FIG. 10, in some embodiments, the address decoder 110 may decode a target address field of the addressed message and may enable the control decoder 112 only when the target address field of the addressed message matches the address stored in the address register 94. If so, the control decoder 112 may cause the memory register 90 to behave in a manner indicated by the control signal field of the addressed message. For instance, the control decoder 112 may cause the memory register 90 to store data being received in the third channel of the outflow bus 32 of the broadcast bus 20. In another example, the control decoder 112 may cause the memory register 90 to output the data to the return bus 34 of the broadcast bus 20 (e.g., when the read-back flag of the read-back (RB) block 100 is set).

Figure 11:
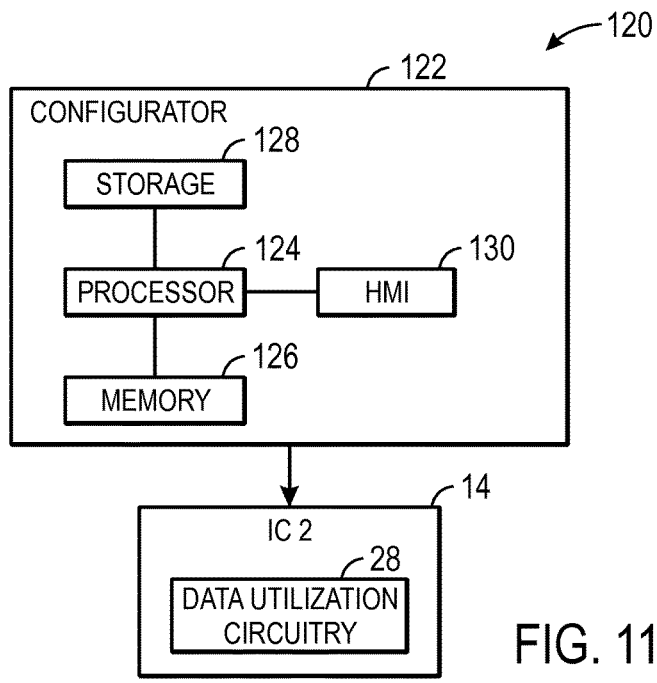
FIG. 11 is a block diagram of a system that can program an integrated circuit using a broadcast bus, in accordance with an embodiment.
Figure 12:
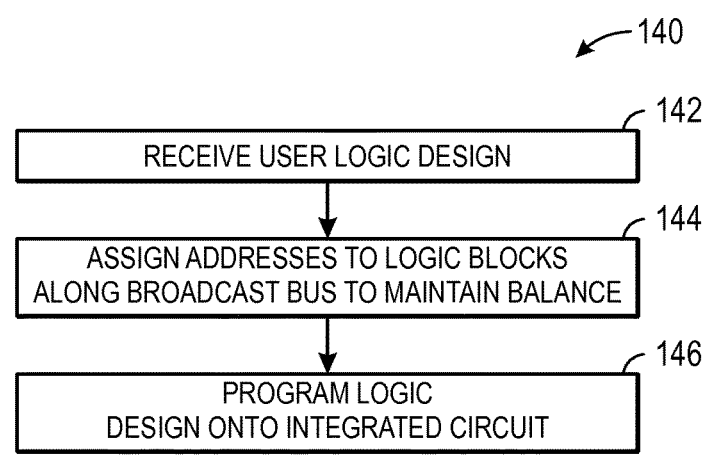
FIG. 12 is a flowchart of a method for programming the integrated circuit of FIG. 11 to receive and transmit signals on the broadcast bus, in accordance with an embodiment.

FIGS. 11 and 12 relate to programming the second integrated circuit 14 when the data utilization circuitry 28 includes programmable fabric. The data utilization circuitry 28 of the second integrated circuit 14 may be programmable when it includes, for example, a field programmable gate array (FPGA) fabric. An integrated circuit programming system 120, shown in FIG. 11, may include a configurator device 122 that may program the second integrated circuit 14. The configurator device 122 may represent any electronic device that can program the data utilization circuitry 28 of the second integrated circuit 14. The configurator device 122 may, in some embodiments, include a processor 124 that executes instructions stored in memory 126 or storage 128. The instructions executed by the processor 124 may include, for example, FPGA-programming software such as QUARTUS® software by Altera Corporation of San Jose, Calif. A human-machine interface (HMI) 130 may enable a user to operate the configurator 122. The human-machine interface 130 may include, for example, input devices such a keyboard, a track pad, a mouse, a touch screen, as well as an electronic display.

As shown in a flowchart 140 of FIG. 12, the configurator device 122 may receive a user logic design for the data utilization circuitry 28 of the second integrated circuit 14 (block 142). The configurator device 122 may assign addresses to logic blocks 22 of the user logic design (e.g., by assigning addresses to program into the address blocks 94 of the logic blocks 22 as provided by the user logic design) (block 144). The assignment of the addresses to the logic blocks 22 may take place in a way that maintains balance along the broadcast bus 20 and may be explicit or implicit. For instance, the addresses may be represented by a register transfer level (RTL) parameter and/or attribute (e.g., an ATOM field). The relevant bits allocated to each hardware component may be tracked and the relevant addresses inserted into a start-of-frame (SOF) stream. Additionally or alternatively, RTL attributes may be used in a hidden way to capture the same information (e.g., a simulator may use cross-hierarchy signals to simulate the operation of the integrated circuit), and the addresses may be allocated on this more implicit basis. Thereafter, the configurator device 122 may program the logic design onto the second integrated circuit 14 (block 146).

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. An integrated circuit comprising:
   a broadcast bus that broadcasts an addressed message comprising content and a target address; and
   a plurality of addressed logic blocks disposed in data utilization circuitry of the integrated circuit, wherein:
   each of the plurality of addressed logic blocks receives the addressed message from the broadcast bus and uses the content of the addressed message only when the target address matches an address assigned to that logic block; and
   a first addressed logic block and a second addressed logic block of the plurality of addressed logic blocks are assigned the same address, wherein the first addressed logic block is directly coupled to the broadcast bus at a first location on the broadcast bus and the second addressed logic is directly coupled to the broadcast bus at a second location on the broadcast bus, wherein, when the addressed message is addressed to the same address assigned to both the first addressed logic block and the second addressed logic block and the content of the addressed message includes an instruction to send a reply message, only the first addressed logic block sends the reply message.

2. The integrated circuit of claim 1, wherein the broadcast bus is directly coupled to each of the addressed logic blocks.

3. The integrated circuit of claim 1, wherein the broadcast bus comprises a plurality of staging blocks that propagate the addressed message over a series of stages of the broadcast bus, starting with an initial stage and ending with a terminal stage, wherein each stage of the broadcast bus is coupled to a subset of the addressed logic blocks, wherein the first location on the broadcast bus is at a different stage than the second location on the broadcast bus.

4. The integrated circuit of claim 3, wherein the plurality of staging blocks comprises a plurality of delay blocks that strengthen the addressed message as it propagates from stage to stage.

5. The integrated circuit of claim 1, wherein the broadcast bus comprises plurality of OR blocks that propagate a read back message output by one of the addressed logic blocks.

6. The integrated circuit of claim 1, wherein the broadcast bus comprises a Spanning tree of serial data lines, wherein the first location on the broadcast bus is on a different serial data line of the Spanning tree than the second location on the broadcast bus.

7. The integrated circuit of claim 1, wherein the broadcast bus comprises a Spanning tree of parallel data lines, wherein the first location on the broadcast bus is on a different parallel data line of the Spanning tree than the second location on the broadcast bus.

8. The integrated circuit of claim 1, wherein the broadcast bus comprises a Spanning tree of a plurality of serial data lines provided in parallel, wherein the first location on the broadcast bus is on a different serial data line of the Spanning tree than the second location on the broadcast bus.

9. The integrated circuit of claim 1, wherein each addressed logic block comprises a read back block that enables or disables that logic block from sending a reply message when the logic block uses the content of the addressed message and the content instructs the logic block to send the reply message.

10. The integrated circuit of claim 9, wherein the respective read back blocks of the first addressed logic block and the second addressed logic block permit only one of the first addressed logic block and the second addressed logic block to send the reply message.

11. The integrated circuit of claim 1, wherein each of the addressed logic blocks comprises a programmable storage that stores the address assigned to that logic block.

12. The integrated circuit of claim 1, wherein the data utilization circuitry in which the addressed logic blocks are disposed comprises a field programmable gate array (FPGA) fabric.

13. The integrated circuit of claim 1, wherein the data utilization circuitry in which the addressed logic blocks are disposed comprises application-specific logic of the integrated circuit.

14. The integrated circuit of claim 1, wherein the plurality of addressed logic blocks comprises a digital signal processor (DSP) block, a memory block, a logical array block (LAB), or any combination thereof.

15. The integrated circuit of claim 1, comprising:
external input/output logic configured to receive an external message from an external integrated circuit;
an external message decoder configured to decode the external message and generate the addressed message based at least in part on the external message; and
broadcast input/output logic configured to broadcast the addressed message over the broadcast bus.

16. A system comprising:
a first integrated circuit configured to issue a control message associated with a specified logic block address; and
a second integrated circuit communicably coupled to the first integrated circuit and comprising a plurality of addressed logic blocks that includes a first addressed logic block and a second addressed logic block, wherein each of the plurality of addressed logic blocks comprises a locally stored address, wherein the locally stored address of the first addressed logic block matches the specified logic block address and the locally stored address of the second addressed logic block also matches the specified logic block address, wherein the second integrated circuit is configured to:
receive the control message;
generate an addressed broadcast message based at least in part on the control message, wherein the addressed broadcast message includes the specified logic block address;
broadcast the broadcast message to the plurality of addressed logic blocks;
at each of the plurality of addressed logic blocks to which the broadcast message has been broadcast, compare the locally stored address with the specified logic block address included in the addressed broadcast message; and
use the broadcast message at the addressed logic blocks having locally stored addresses that match the specified logic block address included in the addressed broadcast message, wherein the broadcast message is used at both the first addressed logic block and the second addressed logic block, wherein the first address logic block and the second addressed logic block are assigned the same address that matches the specified logic block address, wherein the broadcast message is configured to provide a request to read back a first value stored at the first addressed logic block and a second value stored at the second addressed logic block, wherein only the first value stored at the first addressed logic block is read back.

17. The system of claim 16, wherein the control message is configured to provide a value to be stored at the first addressed logic block and the second addressed logic block having the locally stored addresses matching the specified logic block address, and wherein the second integrated circuit is configured to use the broadcast message by storing the value at the first addressed logic block and the second addressed logic block having the locally stored addresses matching the addressed broadcast message.

18. One or more non-transitory, machine-readable media storing instructions to:
receive a logic design for programmable fabric of a programmable logic device, wherein logic blocks of the programmable fabric are accessible by a hardware broadcast bus;
based at least in part on the logic design, assign logic block addresses to logic blocks such that related logic blocks are distributed apart from one another along the broadcast bus, wherein a first logic block of the logic blocks is assigned a first logic block address and a second logic block of the logic blocks is also assigned the first logic block address, wherein the first logic block is directly connected to the broadcast bus at a first location and the second logic block is directly connected to the broadcast bus at a second location, wherein the first logic block reads back data when so requested and the second logic block does not read back data when so requested; and
program the logic design into the programmable logic device.

19. The one or more machine-readable media of claim 18, comprising instructions to set a first read back flag of the first logic block but not set a second read back flag of the second logic block, wherein setting the first read back flag enables the first logic block to read back data when so requested and not setting the second read back flag disables the second logic block from reading back data when so requested.

* * * * *